(12) United States Patent
Brown

(10) Patent No.: US 8,524,620 B2
(45) Date of Patent: Sep. 3, 2013

(54) ENVIRONMENTALLY STABLE HYBRID FABRIC SYSTEM FOR EXTERIOR PROTECTION OF AN AIRCRAFT

(75) Inventor: Arlene McKeeman Brown, Normandy Park, WA (US)

(73) Assignee: The Boeing Company, Chicago, IL (US)

(*) Notice: Subject to any disclaimer, the term of this patent is extended or adjusted under 35 U.S.C. 154(b) by 977 days.

(21) Appl. No.: 12/102,146

(22) Filed: Apr. 14, 2008

(65) Prior Publication Data
US 2009/0039199 A1    Feb. 12, 2009

Related U.S. Application Data

(62) Division of application No. 11/163,614, filed on Oct. 25, 2005, now Pat. No. 7,402,269.

(51) Int. Cl.
*D03D 15/00* (2006.01)

(52) U.S. Cl.
USPC ............ 442/21; 442/23; 442/29; 442/43; 442/210; 442/229; 442/286; 442/294

(58) Field of Classification Search
USPC ........... 442/21, 23, 29, 43, 210, 229, 286, 442/294
See application file for complete search history.

(56) References Cited

U.S. PATENT DOCUMENTS

| | | | |
|---|---|---|---|
| 4,186,237 A | 1/1980 | Propp | |
| 4,448,838 A * | 5/1984 | McClenahan et al. | 442/229 |
| 4,486,490 A | 12/1984 | Patz et al. | |
| 4,554,204 A | 11/1985 | Ono et al. | |
| 5,225,265 A | 7/1993 | Prandy et al. | |
| 5,370,921 A | 12/1994 | Cedarleaf | |
| 6,086,975 A | 7/2000 | Brick et al. | |
| 6,277,771 B1 | 8/2001 | Nishimura et al. | |
| 6,517,658 B1 | 2/2003 | Wagerman et al. | |
| 6,521,331 B1 | 2/2003 | Sikorski et al. | |
| 2008/0274322 A1 | 11/2008 | Kaps et al. | |

FOREIGN PATENT DOCUMENTS

| | | |
|---|---|---|
| EP | 0522663 A1 | 1/1993 |
| EP | 1034921 A2 | 9/2000 |
| WO | 9912727 | 3/1999 |

OTHER PUBLICATIONS

Fisher, Franklin A. et al., "Lightning Protection of Aircraft", Second Edition, 2004, pp. 191-193, Lightning Technologies Inc., Pittsfield, MA.

European Search Report in corresponding EP Application No. 13161770.6, published May 27, 2013.

* cited by examiner

*Primary Examiner* — Elizabeth Cole
(74) *Attorney, Agent, or Firm* — Ostrager Chong Flaherty & Broitman P.C.

(57) ABSTRACT

A method of forming an exterior surface protective structure (12) for an aircraft (10) includes uniting a loaded surfacer (52) having a carrier (51) to a hybrid prepreg substrate (32). The prepreg substrate (32) includes a carbon fabric (44) with an integral conductive component (48) having conductivity within a metal conductivity range and is united to a base substrate (30). The loaded surfacer (52) and the prepreg substrate (32) are cured, which includes interfacially adhering matter between the loaded surfacer (52) and the prepreg substrate (32). A protective fabric system (12) for an exterior (14) of an aircraft (10) includes the base substrate (30). The hybrid prepreg substrate (32) is coupled to the base substrate (30). The loaded surfacer (52) with the carrier (51) is interfacially adhered to the prepreg substrate (32).

13 Claims, 2 Drawing Sheets

ENVIRONMENTALLY STABLE HYBRID FABRIC SYSTEM FOR EXTERIOR PROTECTION OF AN AIRCRAFT

RELATED APPLICATION

This application is a divisional application of, and claims priority from, U.S. application Ser. No. 11/163,614, filed Oct. 25, 2005, now U.S. Pat. No. 7,402,269.

TECHNICAL FIELD

The present invention is related generally to aircraft exterior coatings, layers, surfaces and composites. More particularly, the present invention is related to a system for exterior protection of an aircraft that provides corrosion resistance, rain erosion resistance, environmental durability, structural performance, and electromagnetic protection including lightning protection.

BACKGROUND OF THE INVENTION

Traditionally, to protect against lightning aircraft methods have included a low resistance pathway throughout the metallic bulk of the fuselage to dissipate the electrical energy. Metallized fiber reinforced structural materials have been used along the exterior surfaces of composite parts to provide a medium to rapidly dissipate the energy. Some of the present lightning protective structures, although feasible for use on spacecraft and some aircraft, are not feasible for use on high use commercial aircraft. This is due to the rigorous and continuously changing pressure, humidity, and temperature environment experienced by commercial aircraft, as well as the different cost and maintenance constraints associated therewith.

Testing has shown that under high use commercial aircraft operating conditions certain lightning protective structures tend to experience substrate microcracking and finish cracking making them more susceptible to corrosion and ultraviolet degradation. Microcracking is sometimes referred to as "weave telegraphing." Weave telegraphing refers to when: (a) the visual irregularities in the finishes take on the appearance of the underlying weave pattern of the surface, (b) the pattern becomes more pronounced while in-service, and (c) there is formation and propagation of substrate and/or paint finish cracking. The stated microcracks tend to form due to repeated and extreme temperature, humidity, and pressure fluctuations. Microcracking occurs due to a number of factors including internal stresses from differences in coefficient of thermal expansion, as well as from non-optimum interface adhesion between components in composite systems.

The microcracks can extend into visual paint layers, which can result in appearance degradation and increased maintenance and inspection times and costs. increased maintenance such as paint repair, is needed not just for appearances, but also to identify when repainting is necessary to prevent ultraviolet degradation of the underlying organic materials. Increased inspection is needed not only to monitor corrosion, but also to ensure the microcracks have not adversely affected structural integrity. Thus, such structures are not always cost-effective for long-term use in the commercial environment.

One type of lightning protective structure includes a substrate layer, a metal mesh screen, and a non-structural outer film that may be reinforced with materials such as glass or polyester. The mesh can be a metal woven fabric, random mat, or perforated metal that is usually expanded. Depending on the metal and substrate an additional non-structural prepreg layer may be used for galvanic isolation to avoid corrosion between the base substrate and the metal mesh. Although this structure provides the desired lightning protection, it provides no structural benefit and contains multiple non-structural layers typically. Thus, the structure is inherently labor intensive and costly to produce. The weight of resin needed to encapsulate the mesh to prevent corrosion and provide a smooth surface can exceed the weight of the metal mesh and as a result is heavy. Also the mesh system can be susceptible to microcracking.

Another protective structure approach is to use a solid metal over composite material. This structure is also heavy and difficult to process without manufacturing defects, such as voids, when co-cured as a solid film or applied as a spray to the cured part. Spray processes such as aluminum flame spray have the added complication of requiring qualified personnel and equipment typically not available at airline facilities.

Thus, there exists a need for an improved lightning protective structure for an aircraft that does not exhibit the above-mentioned disadvantages and provides the corrosion resistance, rain erosion resistance, environmental durability, structural performance, and electromagnetic protection including lightning protection characteristics desired.

SUMMARY OF THE INVENTION

One embodiment of the present invention provides a method of forming an exterior surface protective layer for an aircraft by uniting a loaded surfacer having a carrier to a hybrid prepreg substrate. The hybrid prepreg substrate includes carbon fabric with an integral conductive component that is united to a base substrate. The loaded surfacer and the hybrid prepreg substrate are cured at the same time, which includes interfacially adhering matter between the loaded surfacer and the hybrid prepreg substrate. When co-cured with the base substrate processing costs are reduced.

The hybrid substrate of the above-stated embodiment provides increased structural durability, as well as electromagnetic protection. There are no supplemental electromagnetic protection costs associated with the hybrid substrate because the protection is integral to the structural hybrid prepreg thereof.

The embodiments of the present invention provide several advantages. One such advantage is the provision of using an inorganic filler loaded surfacer over a hybrid fabric substrate, which are commingled during cure. The hybrid fabric substrate provides the desired lightning protection while the combination of the loaded surfacer and the hybrid fabric substrate provide the desired structural support and environmental protection. The use of the loaded surfacer inhibits both corrosion and microcracking and thus improves durability.

Another advantage provided by an embodiment of the present invention, is the provision of evenly distributing a loaded surfacer over the surface of a hybrid prepreg substrate and interfacially adhering that surfacer to that substrate. The surfacer which has a carrier and fillers compensates for pressure differences due to design or tooling features that otherwise would promote mark-off and lead to large variations in surfacer thickness. This assists in preventing the type of weave telegraphing that leads eventually to substrate microcracks and paint cracks. The above-stated advantages in combination provide a protective structure that is capable of withstanding the qualification testing and operating environment for high use commercial aircraft.

The present invention itself, together with further objects and attendant advantages, will be best understood by reference to the following detailed description, taken in conjunction with the accompanying drawing.

Other features, benefits and advantages of the present invention will become apparent from the following description of the invention, when viewed in accordance with the attached drawings and appended claims.

BRIEF DESCRIPTION OF THE DRAWINGS

For a more complete understanding of this invention, reference should now be made to embodiments illustrated in greater detail in the accompanying figures and described below by way of examples of the invention wherein.

DETAILED DESCRIPTION

It has been determined through testing that under high use aircraft operating conditions that lightning protective structures containing carbon fiber with metal wires, which is disposed within an epoxy resin tend to experience substrate microcracking and finish cracking. The present invention overcomes this and is described in detail below. While the present invention is described primarily with respect to the formation of an exterior protective structure for an aircraft, the present invention may be applied and adapted to various applications. The present invention may be applied in aeronautical applications, power applications, nautical applications, railway applications, automotive vehicle applications, medical applications, and commercial and residential applications where the need for a durable lightning protective structure that exhibits minimal or no weave telegraphing is desired and particularly when weight or labor costs are of a concern. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "component" refers to an artifact that is one of the individual parts of which a composite entity is made up. A component may refer to a part that can be separated from or attached to a system, a part of a system or assembly, or other part known in the art.

In addition, the term "surface" refers to the outer boundary of an artifact or a material layer constituting or resembling such a boundary. A surface may include not only the outer edge of a material, but also an outermost portion or layer of a material. A surface may have a thickness and include various particles.

Figure 1:
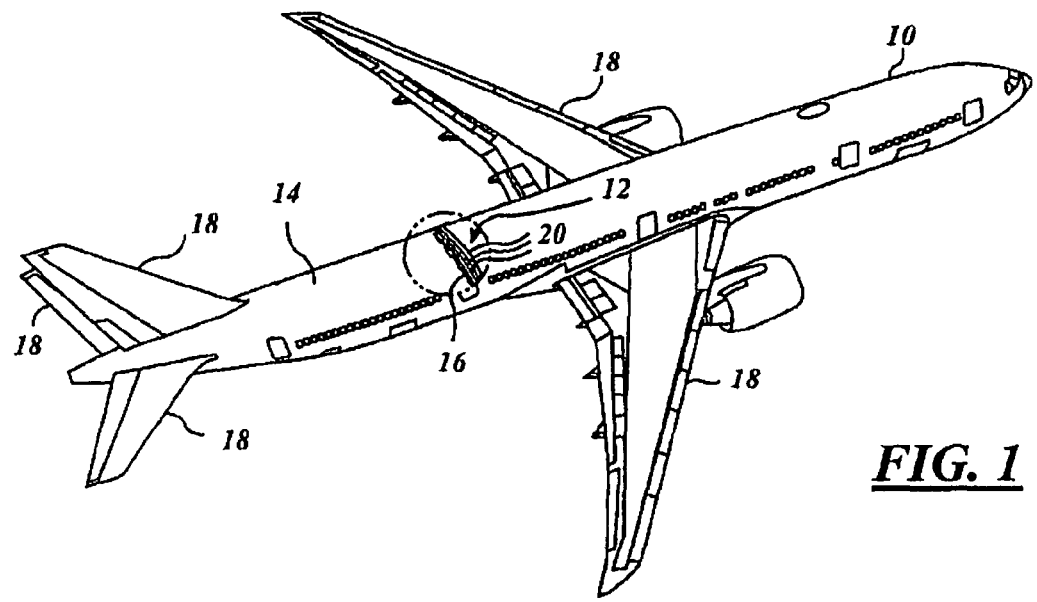
FIG. 1 is a perspective view of an aircraft incorporating a sample exterior fabric protective system in accordance with an embodiment of the present invention.

Referring now to FIG. 1, a perspective view of an aircraft 10 incorporating a sample exterior fabric protective system 12 in accordance with an embodiment of the present invention is shown. The protective system 12 provides structural support across the exterior 14 of the aircraft 10. The protective system 12 is applied over an aircraft part(s), such as the fuselage 16 and tail or wings 18, of the aircraft 10 to protect against lightning and to endure other environmental conditions. The protective system in combination with the fuselage 16 may be considered the main support structure of the aircraft 10. The protective system 12 includes multiple layers 20, which are described in detail below.

Figure 2:
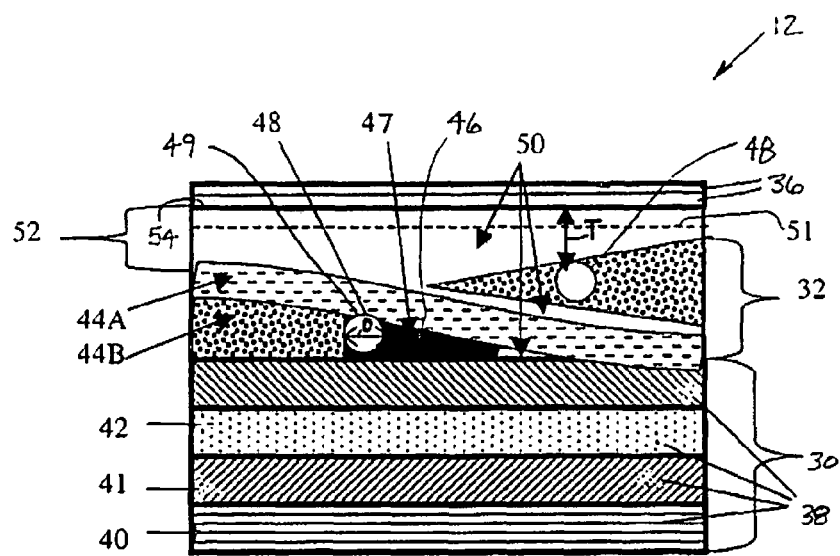
FIG. 2 is a side close-up cross-sectional view of the sample exterior fabric protective system of FIG. 1.

Referring now to FIG. 2, a side close-up cross-sectional view of the protective system 12 in accordance with an embodiment of the present invention is shown. The protective system 12 includes a base substrate 30. A hybrid prepreg fabric substrate 32 is disposed over and coupled to the base substrate 30. A loaded surfacer film 52 is disposed over and is coupled to the hybrid substrate 32. Finishes or finish layers 36, such as spray-applied surfacers, pin hole fillers, primers, and paint topcoats, may be applied to the loaded surfacer 52. Although a particular number of layers are shown for each of the base substrate 30, the hybrid substrate 32, and the loaded surfacer 52, any number of layers may be utilized. In other words, although a single paint layer, a single loaded surfacer layer, a single hybrid prepreg substrate layer, and four base substrate layers are shown, any number of each may be used. For example, additional layers of the hybrid substrate may be used to improve performance.

The base substrate 30 may be a composite structure and include multiple structural support layers 38. The structural support layers 38 may be formed of a carbon fiber/epoxy or the like and be in tape or fabric form. The structural support layers 38 may have varying angles of placement. For example, each adjacent layer, such as layers 40, 41 and 42, may have unidirectional carbon tape in a different orientations, such as at 0.degree., +45.degree., and 90.degree., to increase structural performance and overall durability of the base substrate 30. The base substrate 30 is the inner portion of the aircraft part. The aircraft part may be a laminate, a sandwich structure, or a structure having a combination thereof and formed of various metallic or nonmetallic materials. Although in one envisioned embodiment of the present invention the base substrate 30 is applied to a carbon/epoxy composite fuselage, the base substrate 30 may be applied to some other composite or hybrid parts formed of various materials known in the art.

The hybrid substrate 32 includes carbon fibers 44, metal integral to the carbon in the form of wires 48 and an epoxy resin 46. FIG. 2 shows a resin rich area 47 around one wire 49, but actually the epoxy is disposed throughout the hybrid substrate 32. The hybrid substrate 32 may be in the form of an interwoven wire fabric (IWWF), as shown, or the like. Fibers 44A are shown in a carbon tow of the hybrid substrate 32 and extend perpendicular to the wires 48. Carbon tows 44B are shown and extend parallel to the wires 48. The fibers 44A and the carbon tows 44B together form an IWWF 53. Although wires 48 are shown as extending in a single direction, they may extend in other directions.

The term "IWWF" refers to a carbon fiber that is woven typically into a plain weave fabric but other weave styles may be used. Each tow of the plain weave fabric contains a conductive component or wire, such as one of the wires 48. In the embodiment shown, the wires 48 have an approximate cross-sectional diameter D of 0.004 inches. The IWWF 53 does not include a discrete metal screen, as does metal woven fabrics or structures having expanded metal foil layers. The IWWF 53 is a hybrid fabric with metal wires contained therein as an integral component. The IWWF 53 can carry load unlike the more common lightning protection structures containing metal meshes and foils. An example IWWF that may be used is the Toray Composites (America) Inc. of Tacoma, Wash., IWWF epoxy prepreg FL6676G-37E containing intermediate modulus high strength carbon fibers. The IWWF 53 may have approximately 112 ksi tension strength and 10 MSI tension modulus when fabricated from IWWF prepreg with a 30%-50% epoxy resin content based on a carbon weight of about 50%-70%. Another example that may be used to form the hybrid substrate 32 is the combination of AS-4 carbon fiber from Hexcel Corporation of Dublin, Calif. with material identification no. 977 epoxy from Cytec Engineered Materials Inc. of Anaheim, Calif.

The fibers within the hybrid substrate 32 may be of a variety of carbon types. Of course, other fibers, fabric styles, metals and resins or the like may be used that have similar properties to that of which previously stated.

The hybrid substrate 32 can be pre-impregnated, more often referred to as "prepreg", or can be a dry hybrid fabric product with epoxy resin added as part of the production process such as with resin transfer molding or resin infusion. An example of a dry hybrid fabric product is AS-4 carbon fiber from Hexcel Corporation. A hybrid fabric substrate is primarily carbon fabric with a small percentage of metal or other highly conductive material coupled to the base substrate. The conductive component of the hybrid substrate 32 discussed herein may be in the form of continuous metallic wire contained within approximately each carbon tow 44B, but is not necessarily limited to that form or material. The ratio of metal/carbon/resin is dependent on the type of components and service environment. The amount of resin utilized is maintained within a predetermined range to prevent microcracking and to maintain porosity levels below approximately 2% and to provide a desired structural integrity. The amount used may be measured with ultrasonic inspection equipment. The microcracking and porosity levels set the low end of the range. The structural integrity desired sets the upper end of the range.

Unlike metal meshes, the hybrid substrate 32 provides structural benefit, not just electromagnetic protection. Weight of the hybrid substrate that is associated with providing electromagnetic protection including lightning protection, shielding protection, and static electricity protection is reduced because the amount of metal content is reduced.

The hybrid substrate 32 or the IWWF mentioned above may include wire formed of phosphor bronze, aluminum, nickel coated copper, copper, stainless steel, or other conductive materials having similar electrical and thermal characteristics or a combination thereof. Aluminum or other similar material, due to its density, conductivity, and thermal properties may be used for improved lightning performance. On the other hand, stainless steel or the like may be utilized for improved corrosion resistance. Cost, availability, corrosion susceptibility, internal stresses, including those from coefficient of thermal expansion, other thermal and electrical properties are some of the parameters considered when forming a protective structure for a given application. The hybrid substrate 32 provides added structure support to the aircraft 10 and can be used as part of the main support structure. The hybrid substrate 32 may replace a portion of the base substrate 30 or structural support layers 38. Thus, the hybrid substrate 32, in general, reduces the thickness and weight of the base substrate 30, the time and costs to produce the base substrate 30, and the overall weight of the aircraft 10.

The loaded surfacer 52 is loaded with an inorganic filler (not shown), such as titanium dioxide. The inorganic fillers and a carrier, represented by the dashed line 51, are in the organic resin epoxy 50. The epoxy 50 may be loaded with inorganic fillers including fumed silica and alumina, as well as other fillers known in the art or a combination thereof. The carrier 51 may be in the form of a polyester mat, a carbon fiber mat, a glass mat, a metallized mat or the like. The amount of conductive carriers may be increased to improve lightning resilience. The organic epoxy 50 is compatible to cure temperatures of approximately between 250-350.degree. F. The loaded surfacer 52 has an approximate weight range between 0.02-0.06 pounds per square foot (lb/ft.sup.2) when having an approximate thickness T of 0.004 inches above the wires 48 after cure. The weight of the loaded surfacer 52 is proportionally adjusted based on the resin content and flow characteristics of the IWWF or similar material and the tooling fit-up to ensure an adequate amount of surfacer is between the wire and outer surface for long term durability in a high use commercial aircraft environment. An example of a loaded surfacer that may be used is Cytec Engineered Materials Surface Master 905, which has a nominal weight of 0.0325 lb/ft.sup.2. The loaded surfacer 52 provides a surface that is suitable for priming and painting.

Microscopic photographs similar to FIG. 2 reveal surfacer locally penetrates through the hybrid substrate 32 down to the base substrate. The loaded surfacer 52 is selected such that the conductive component 44 in the hybrid substrate 32 can vaporize through the loaded surfacer 52 and any paint layers thereon for maximum protection.

Historically, surfacers have not been used because they tend to degrade lightning performance of a protective structure. However, the commingled technique described herein along with the use of an IWWF provides a protective structure that satisfies lightning protection requirements. The thickness T of the loaded surfacer 52 is adjusted depending upon the amount of lightning protection and the amount of other environmental protection desired. The amount of environmental protection, such as the amount of rain erosion resistance, the amount of corrosion resistance, and the overall durability, is traded against the amount of lightning protection. In general, the thicker the loaded surfacer 52 the less lightning protection, but the more environmental protection provided and vice versa. Continuing from the example above, the 0.0325 lb/ft.sup.2 surfacer version using Surface Master 905 when combined with a hybrid prepreg substrate with approximately 40% resin content, having a dry preform that consists of approximately 196 grams/meter.sup.2 of carbon and approximately 63 grams/meter.sup.2 of metal, can prevent puncture from initial lightning attachment for typical aircraft configurations. A typical aircraft configuration is one with standard production finishes and that is tested to levels required for aircraft certification to meet Federal Aviation Regulation (FAR) Part 25.

The protective system 12 is durable and can withstand environmental cycling associated with a commercial aircraft including those such as high use large commercial aircraft. Prior to approval for commercial use exterior portions of an aircraft undergo rigorous testing to simulate commercial use. Some of this testing includes subjecting a component to large variations in temperature, humidity and pressure extremes. For example, a test specimen may be exposed to humidity levels of 95% for hours at approximately 120.degree. F. and may undergo 4000 or more cycles of temperature fluctuations from between approximately −65.degree. F. to 165.degree. F. to show commercial feasibility. The testing may include cycling for thousands of times in ground-air-ground chambers that simulate the change in pressures, humidity, and temperature having limits that correspond with flight profiles.

Figure 3:
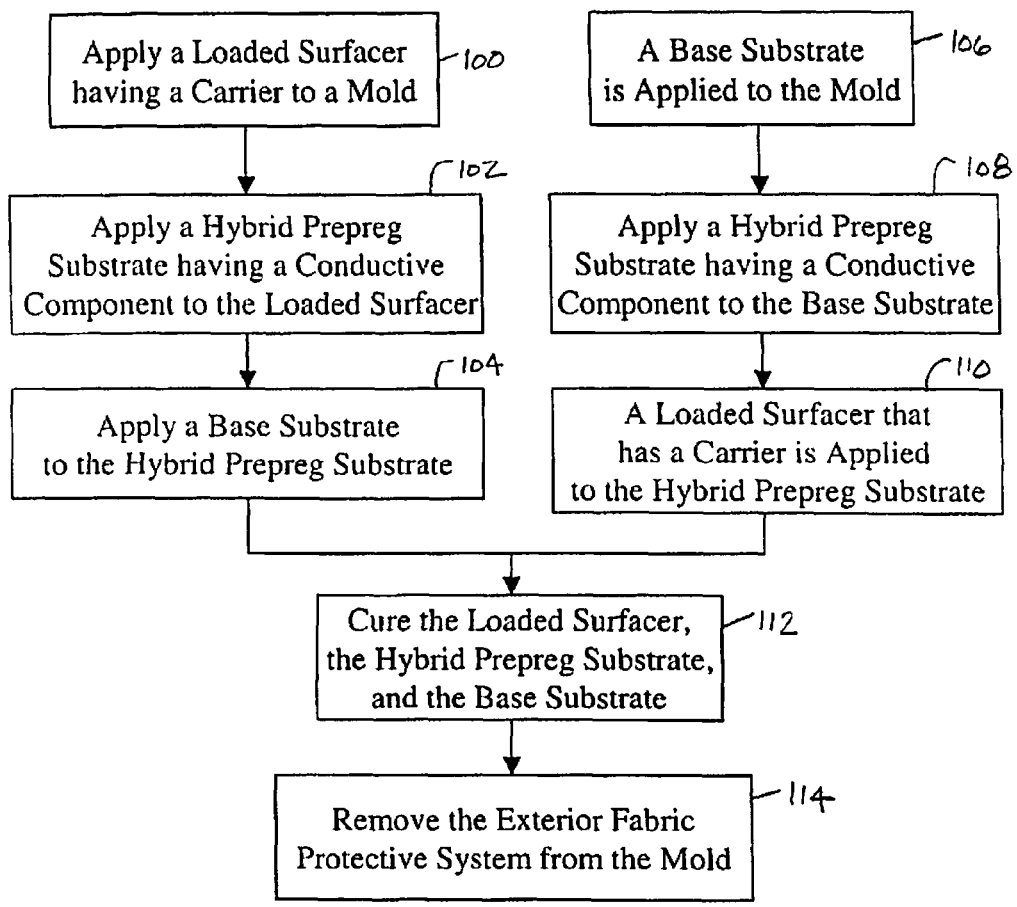
FIG. 3 is a logic flow diagram illustrating a method of forming an exterior fabric protective structure in accordance with an embodiment of the present invention.

Referring now to FIG. 3, a logic flow diagram illustrating a method of forming an exterior fabric protective structure or system, such as the system 12, in accordance with an embodiment of the present invention is shown. Although the following steps are primarily described with respect to the embodiment of FIG. 2, the steps may be easily modified to apply to other embodiments of the present invention.

In step 100, a loaded surfacer having a carrier, such as the loaded surfacer 52 and the carrier 51, is applied to a mold. The mold may be of various types, styles, shapes, and sizes, depending upon the component or structure being formed. In step 102, a hybrid prepreg substrate, such as the hybrid substrate 32 with carbon fabric 44 and metal 48, is applied onto the loaded surfacer. In one embodiment, the prepreg substrate is an IWWF, as described above. In step 104, a base substrate, such as the base substrate 30, is applied to the prepreg substrate. In this example described, the base substrate is in the form of prepreg and is co-cured. However, the layers of the base substrate may be preformed and cured prior to or subsequent to application of the prepreg substrate. However, performance may be different depending on the co-bonding technique used.

The following steps 106-110 are similar to steps 100-104, however are performed in a reverse order. In step 106, a base substrate is applied to a mold in the form of a prepreg. The layers of the base substrate may be preformed and cured prior to or subsequent to application on or insertion into the mold. In step 108, a hybrid prepreg substrate having carbon fabric and an integral conductive component, such as wire, is applied to the base substrate. In step 110, a loaded surfacer that includes a carrier is applied to the hybrid prepreg substrate.

In step 112, the loaded surfacer, the prepreg substrate, and the base substrate are cured to form the protective system. The mold including the loaded surfacer, the hybrid prepreg substrate, and the base substrate are placed into an autoclave or the like and baked. The temperature within the autoclave is approximately between 245-355.degree. F. for this example. The curing temperature used is below the melting temperature of the conductive component or wires within the hybrid substrate to prevent melting of the wires. The length of time that the mold is within the autoclave is dependent upon the curing properties of the materials utilized. During the curing process the loaded surfacer is interfacially adhered to the hybrid prepreg substrate rather than the loaded surfacer remaining entirely on top of the prepreg substrate. Matter or resin in the loaded surfacer and in the prepreg substrate mixes together and cures, thereby interfacially adhering to each other.

In addition, the loaded surfacer is such that when heated it evenly distributes and cures across the mold and/or the prepreg substrate to form a single continuous layer having a certain thickness, such as thickness T. This assures that the wires, such as the wires 48, within the prepreg substrate are covered by the loaded surfacer. In an example embodiment, the loaded surfacer utilized cures to have a thickness that is approximately 0.004 inches. The loaded surfacer may extend down to the base substrate in localized areas. Commingling during cure of the resin in the surfacer with the resin in the hybrid fabric substrate while maintaining sufficient surfacer layer content on top of the conductive component provides the desired environmental durability.

In step 114, upon curing of the protective structure or system formed by the curing of the loaded surfacer, the prepreg substrate, and the base substrate is removed from the mold.

The above-stated commingled surfacer approach is especially beneficial, depending upon the application, for the higher strength and or higher modulus carbon types, particularly those that are impregnated with resins that are susceptible to microcracking. The above-described steps are meant to be illustrative examples; the steps may be performed sequentially, synchronously, simultaneously, or in a different order depending upon the application. Of course, portions of the system described and the steps performed may be achieved manually or without the use of specialized equipment or machines.

The present invention provides a cost effective and efficient system and method for the formation of lightning protective system. The present invention is lightweight, simplistic in design, prevents corrosion, and is durable. As such, the present invention increases service life and reduces maintenance costs of an aircraft and associated exterior components.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

I claim:

1. A protective fabric system comprising:
a base substrate;
a hybrid prepreg interwoven wire fabric layer disposed over and coupled to the base substrate, the hybrid prepreg interwoven wire fabric comprising carbon fibers in the form of tows woven into a weave pattern, an integral conductive component in the form of metallic wire contained within approximately each of the tows, and a first resin; and
a loaded surfacer disposed over and interfacially adhered to the hybrid prepreg interwoven wire fabric layer, the loaded surfacer comprising a carrier loaded with at least one inorganic filler and a second resin separate from the first resin, wherein in localized areas the loaded surfacer penetrates through the hybrid prepreg interwoven wire fabric layer to the base substrate.

2. A system as in claim 1 wherein the base substrate comprises a plurality of structural support layers.

3. A system as in claim 1 wherein the hybrid prepreg interwoven wire fabric layer provides structural support.

4. A system as in claim 1 wherein the interwoven wire fabric layer comprises a plain weave and the first resin is an epoxy resin impregnated within the weave.

5. A system as in claim 1 wherein the interwoven wire fabric layer comprises a plurality of wires disposed with a plurality of tows.

6. A system as in claim 1 wherein the metallic wire is formed of at least one material selected from phosphor bronze, nickel coated copper, copper, aluminum, and stainless steel.

7. A system as in claim 1 wherein the loaded surfacer comprises an inorganic filler and forms a continuous layer over the hybrid prepreg interwoven wire fabric layer.

8. A system as in claim 7 wherein the inorganic filler is a material selected from at least one of fumed silica, alumina, and titanium dioxide.

9. A system as in claim 7 wherein the second resin comprises an epoxy having an approximate cure temperature between 250-350° F.

10. A system as in claim 1 wherein the second resin has an epoxy having an approximate curing temperature of 350° F.

11. A system as in claim 7 wherein the continuous layer has an approximate thickness of 0.004 inches.

12. A system as in claim 1 wherein the loaded surfacer has an approximate weight of approximately between 0.02-0.06 pounds per square foot with a thickness of approximately 0.004 inches.

13. A system as in claim 1 wherein the carrier is formed of a material selected from at least one of a polyester mat, a carbon mat, a carbon fiber mat, a glass mat and a metallized mat.

* * * * *